Nov. 29, 1938.  R. T. KILLMAN ET AL  2,138,380
AUTOMATIC NOZZLE
Filed April 14, 1937
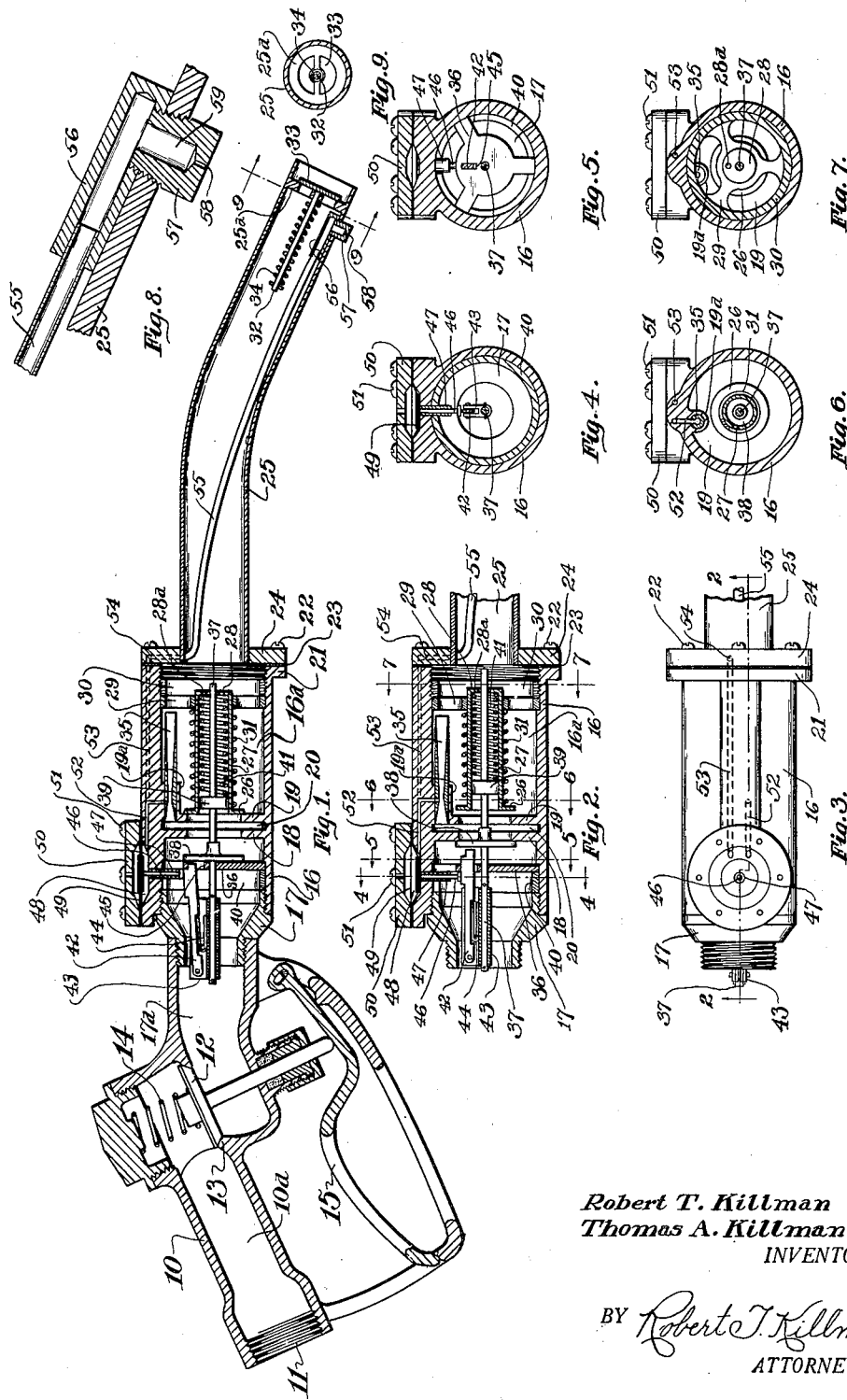
Robert T. Killman
Thomas A. Killman
INVENTORS
BY Robert T. Killman
ATTORNEYS.

Patented Nov. 29, 1938

2,138,380

UNITED STATES PATENT OFFICE 2,138,380

AUTOMATIC NOZZLE

Robert T. Killman and Thomas A. Killman, Nashville, Tenn.

Application April 14, 1937, Serial No. 136,784

11 Claims. (Cl. 226—127)

This invention relates in general to liquid dispensing nozzles or spouts such as, for example, gasoline dispensing nozzles, commonly used in automobile service stations attached to the end of a flexible hose line and supplied with gasoline from a meter pump, for dispensing gasoline and conveying it into automobile fuel tanks, and relates more specifically to a nozzle which will automatically cut off the flow of liquid when the tank or container becomes full or when the liquid therein rises to some pre-determined level.

In the operation of automobile service or filling stations, it is often difficult to ascertain when the fuel tank of an automobile being filled with gasoline has become full so that the supply of gasoline may be shut off without running the tank over and causing a waste of gasoline, spattering of gasoline over the surfaces of the car adjacent the filler opening, and fire hazard. The liquid level indicating gauges usually installed upon the automobiles are often unreliable, and are generally located upon the dashboard of the automobile out of sight of the service station attendant who is filling the tank. Very often, due to gauge inaccuracies, a customer will order a certain specified number of gallons of gasoline when in reality the tank cannot accommodate the addition of the specified amount, thus tending to cause the tank to be run over.

It is an object of the present invention to provide means whereby the flow of gasoline, or other fluid, into a tank or other container, will be automatically shut off before the tank is filled to overflowing, entirely independent of and without any attention from the operator.

The fundamental principle of operation is as follows: Fluid flows through a Venturi tube which has its suction opening connected to a chamber having a movable wall (such as a bellows, a diaphragm, a piston or the like). This chamber is connected by a tube to the position which the upper surface of the liquid in the container is desired to occupy at the moment the flow of liquid is desired to be cut off. Until the liquid surface reaches this predetermined level, this tube supplies the chamber with air in such quantities that the Venturi tube is unable to evacuate said chamber sufficiently to cause movement of said movable wall. When, however, the liquid reaches the predetermined level and covers the end of said tube, it cuts off the air supply to the chamber and due to the great preponderance of the viscosity of the liquid over that of the air, the liquid is unable to travel through the tube and through certain restricted portions thereof, in sufficient quantities to prevent the Venturi tube from evacuating the chamber sufficiently to cause a movement of said movable wall, which movement causes a closure of a valve, thus cutting off the flow of the liquid.

We are aware that a number of devices of this type have been previously made, but all of them which have come to our attention are subject to certain faults and disadvantages.

For example, all of the prior devices of this type caused the entire fluid flow to pass through the Venturi tube. Since the efficiency of Venturi tubes in producing a vacuum depends upon the amount and the speed of the fluid passing therethrough, and these tubes must in all cases, in order to operate at all, be supplied with fluid in sufficient quantities to entirely fill them, it will be evident that if the flow of gasoline through a nozzle of this type is decreased beyond a certain minimum the device will become wholly inoperative. In order to accommodate the full flow of the gasoline the Venturi tube must be made comparatively large, and therefore the minimum flow, above mentioned will be large. Therefore in all devices of this type, the flow controlling valve is intended to be latched or held by the operator in its wide open or full flow position, in order that the Venturi tube may function properly.

Now it is well known to those experienced in the operation of gasoline filling stations that an increasing number of automobiles have fuel tanks and filler tubes and openings which will not receive gasoline at a high rate. This is due to the fact that the inlet tube which extends from the filling neck of the gasoline tank storage tank of some automobiles is now formed with baffles and with curved portions in order to prevent a siphon tube from being used so as to illegally remove gasoline from the tank. Also artistic considerations, streamlining etc., in the designing of modern cars has necessitated the placing of the filler opening some distance from the fuel tank and connecting the two by means of a relatively long, tortuous, and often very small pipe. It may be mentioned here that this construction makes impractical the use of floats, etc., which must extend a considerable distance into the fluid in order to be operative.

Since, very rarely are fuel tanks vented to any extent, except through the filler opening, difficulty in filling such tanks at any great speed is frequently encountered, due to the entrapped air in the tank, preventing additional gasoline from entering and in escaping through the filler tube carrying gasoline outward with it causing overflowing even though the fuel tank is not full of gasoline. In order to fill a tank of this type, the rate of flow of the gasoline must be greatly reduced, and the inability to operate at the necessary reduced flow is one of the faults of prior devices of this character. Accordingly, it is an object of the present invention to provide an automatic shut-off nozzle which remains fully operative and efficient over the full range of flow from a few drops to the full flow of gasoline as delivered by the meter pump, said range of flow conditions covering any and all rates of flow necessary to properly fill the most recalcitrant tank to be met in practical operation. It is contemplated in this invention that the rate of flow of gasoline be at all times under complete control of the operator, who may, by operating a single grip lever, start or stop the flow, or adjust it to any desired rate or volume at will without interfering with or being interfered with by the automatic action of the device.

Another fault inherent in all prior devices of this character with which we are familiar is due to the fact that they all make use of the restriction due to the small bore of the tube above mentioned (which connects the chamber with the location of the desired fluid level at which cut-off should occur) to distinguish between the difference in viscosity of fluid and air to cause the movable wall to cause the shut-off valve to operate. The fault lies in that if the device is once operated the small tube is left full or nearly full of fluid trapped therein either by capillary action or gravity etc. Upon attempting to use the device a second time, this entrapped fluid, due to its viscosity and the smallness of the bore of the tube, prevents air from reaching the chamber and causes an immediate movement of the movable wall and a shutting-off of the fluid flow. This false operation takes place every time an attempt is made to pass fluid through the nozzle until the small tube is cleared of fluid.

Accordingly an object of the present invention is to provide, in a device of this character, means whereby false operations of the device will be entirely eliminated and a prior operation of the device always leaves it in perfect operable condition for any subsequent operation, without any resetting, clearing of tubes or other attention on the part of the operator.

Another object of the present invention is to provide a device of this character which, due to the absence of floats, weights, etc., will operate in any and all positions in which it is possible to use it to fill a tank, and which, with the exception of automatically shutting off the flow of fluid when the tank becomes full to the predetermined level, is not different in operation in any way from the ordinary dispensing nozzles now in common use.

It is well known that nearly all liquids, gasoline included, when directed into a tank have a tendency to bubble or foam, and that this foam in some cases bubbles out of the filler tube when the tank becomes almost full. If this foam or bubbles is allowed to overflow, almost as much damage is done as if the fluid itself had overflowed. Accordingly it is an object of the present invention to provide in a device of this character means whereby the automatic operation is caused to take place by any foam or bubbles which may be on the liquid surface if such foam or bubbles tend to rise higher than the predetermined level. The operation of the device does not depend upon the inertia or momentum of any current of fluid, as do certain prior devices, and therefore, will automatically shut off the flow when the fluid level rises to such height that there is danger of foam or bubbles overflowing.

Another object of the present invention is to provide in a device of this character means whereby the operator is given a signal, which may be felt, seen and heard, that the automatic operation has taken place and cut off the flow of fluid.

Another object of this invention is to provide a nozzle having means associated therewith for automatically and entirely shutting off the flow of fluid therethrough without appreciably changing the dimensions from those of the conventional nozzle in common use today. Therefore, this improved nozzle may be used for delivering gasoline into tanks having filling necks of conventional construction.

Another fault or disadvantage inherent in prior devices of this general type is the fact that even after the automatic cut-off operation has taken place and the flow is stopped, there remains within the device a considerable quantity of liquid on the down-stream side of the cut-off valve which must be drained into the car fuel tank, and in some cases this additional drainage is enough to over run the tank, particularly if the spout or nozzle were inserted in the filler tube of the fuel tank for only a short distance, and consequently the automatic cut-off operation took place when the fluid level is relatively high in the filler tube.

Accordingly it is a further object of this invention to provide means, in a device of this character, whereby, when the automatic cut-off operation has taken place, all drainage of fluid from the interior of the nozzle is prevented, the flow into the fuel tank stopping instantly with the operation of the automatic cut-off, thus preventing any additional filling of the fuel tank, dripping of gasoline over the car body, waiting for the dripping to cease and other disadvantages.

Another object of the present invention is to provide a device of this type which does not have protruding or external levers, latches, triggers or the like, which may come into contact with some external objects such as the car body or accessories, the hands or other portions of the operator's body etc. and thereby be prevented from operating properly or be caused to operate falsely thereby. The only projecting lever is the usual manual valve operating grip lever and this is in no way connected with the automatic mechanism.

Another object of the present invention is to provide a device of this character which may be manufactured as a complete nozzle, or certain portions of which may be used as an attachment or accessory to nozzles now in use.

A further object is to provide a device of this character which will be formed of a few strong simple and durable parts, which will be inexpensive to manufacture and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

It is to be understood, of course, that this nozzle or spout is not limited for any particular use. It may be used for filling any kind of tank or receptacle with a variety of different fluids. It is described in connection with automobile fuel tanks for the reason that they will be its most general use.

The method of accomplishing the above mentioned objects and advantages will be clearly understood by reference to the following description in connection with the accompanying drawing, in which, Figure 1 is a vertical, longitudinal, sectional view through a filler nozzle or spout constructed in accordance with our invention showing all parts in their normal position, i. e. the position they occupy when the nozzle is not being used to deliver fluid, the manually operable valve being closed.

Figure 2 is a vertical, longitudinal, sectional view of a portion of same showing a different phase in the operation of the device, and is taken along the line 2—2 of Figure 3.

Figure 3 is a plan view of a portion of the device with the diaphragm and cover plate removed, Figures 4, 5, 6, and 7 are cross-sectional views of the device taken along the lines 4—4, 5—5, 6—6, and 7—7 respectively of Figure 2, looking in the direction indicated by the arrows, Figure 8 is an enlarged sectional view of the orifice member shown in Figure 1, and Figure 9 is a cross-section of the device taken along the line 9—9 of Figure 1, looking in the direction of the arrows.

Referring now in more detail to the drawing the numeral 10 designates a casing adapted to threadedly engage by means of threads 11 a suitable gasoline hose which is preferably connected at its other end with a suitable gasoline meter pump by which gasoline is drawn from an underground supply tank and forced under a pressure of approximately 15 or 20 pounds per square inch into said hose. A manually operable valve 12, normally urged to a closed position upon its seat 13 by a spring 14, is contained within casing 10 and may be operated by gripping lever 15 to raise it from its seat a desired amount, and thus allow and govern a flow of fluid from the hose through casing 10.

A second, generally cylindrical casing 16 is joined at one end to casing 10 by the tapered threaded collar 17. The other end of casing 16 has formed thereon a flange 21 to which is affixed, by means of screws 22, the joint being sealed by a suitable gasket 23, the cooperating flange 24 in which is affixed by some suitable manner, as, for example, soldering, the delivery pipe 25 which is adapted to direct the flow of fluid into the automobile fuel tank. Pipe 25 is provided at its outlet end with a valve seat 25a, formed with a plurality of spokes supporting a central bushing. Slidably mounted within this bushing is the valve stem 32 which carries at its outer end the valve plate 33 normally urged against its seat 25a by the valve spring 34 which surrounds valve stem 32 and seats against said bushing and a suitable pin affixed in the upper end of the valve stem 32.

Formed interiorly of, and integrally with casing 16, and at right angles to the longitudinal axis thereof are the two apertured partitions 18 and 19, spaced apart along the longitudinal axis of casing 16 to form the annular chamber 20 between them.

Thus it will be seen that the device is divided into several fluid chambers, i. e., a supply chamber, which includes the space in casing 10 limited at one end by the threaded opening 11 and at the other by the upper surface of manual valve 12 and which will be designated supply chamber 10a; a pressure chamber, which includes the space, partly in casing 10, partly in collar 17 and partly in casing 16, which is limited at one end by the lower surface of manual valve 12 and at the other end by partition 18 and which will be designated pressure chamber 17a; a middle chamber 20, previously described, which lies wholly within casing 16 between partions 18 and 19; and an outlet or discharge chamber which lies partly within casing 16 and partly within delivery pipe 25, and is limited at one end by partition 19 and at the other end by valve seat 25a and which will be designated outlet chamber 16a.

For purposes of clarity the portions of the device nearest the supply hose will be called the upstream portions and the portions of the device farthest from the hose will be called the downstream portions, since the normal fluid flow is from the hose through casing 10, past valve 12, through collar 17, casing 16, delivery pipe 25, into the automobile fuel tank. Similarly, of two members, the one nearest the hose will be said to be upstream from the other of said members. Hence the partition 18 is upstream from the partition 19.

Cooperating with the downstream side of partition 19 is the spring-loaded fluid pressure control valve 26 which normally closes the central aperture in partition 19 and which has attached to it the cylinder 27 which is closed at its other end by an end wall 28. A perforated plate 29, held against an interiorly formed shoulder in casing 16 by the collar 30, which threadedly engages the interior surface of casing 16 at the downstream end thereof, is provided with an opening in which cylinder 27 is slidable and thus acts as a guide for the valve 26 as well as a seat for the spring 31 which urges valve 26 against partition 19 as a valve seat. The perforations in plate 29 allow free flow of fluid therethrough.

An aspirator, injector, or Venturi tube 35 is mounted within a thickened portion 19a of partition 19, its inlet opening communicating with the middle chamber 20 and its discharge opening communicating with the outlet chamber 16a. The passage through this Venturi tube is preferably made relatively small so that it will operate at high efficiency with but a very small fluid flow therethrough. For example, we have used, and have found satisfactory, in models constructed according to this invention, an opening which tapers from $\frac{3}{16}$ of an inch at the ends inwardly to a constriction the size of a number 50 drill. The purpose of making the venturi of such small size will be explained in detail later in this specification.

A three fingered guard and bearing plate 36 is secured against a suitable interiorly formed annular shoulder in casing 16 by means of the split spacer ring 40 which in turn is secured by the collar 17. Slidably mounted within a central hole located in plate 36 is the valve stem 37 which is also slidably received in the centrally located hole in the end plate 28 of the cylinder 27. A valve plate 38 is affixed to valve stem 37 between guard plate 36 and partition 18 and is operable to co-act with the upstream surface of partition 18 as a valve seat to stop off of the aperture through partition 18. Also affixed to valve stem 37 and slidably received within cylinder 27 is the fairly close fitting piston member 39. A small hole 28a in the head 28 of cylinder 27 prevents entrapment of fluid within said cylinder. The size of hole 28a may be gauged to give a cushioning effect to the automatic operation, if desired, as will be explained later. A spring 41 surrounds the valve stem 37 within cylinder 27 and abuts head plate 28 and piston 39 urging piston 39 outward from cylinder 27 and thus urging valve stem 37 and valve plate 38 which is carried thereby to the left as regards Figures 1 and 2 until valve plate 38 lies against guard plate 36 as shown in Figure 1.

A latch member 42, having a notch in one end and pivoted at the other end to a channel member 43 rotatably mounted (but without end play) upon valve stem 37, and urged upward and away from said valve stem by a U-shaped spring 44 is adapted to engage the upper edge portion of a vertical rectangular slot 45 formed in guard plate 36 and thus normally latch valve stem 37 so that valve plate 38 is retained in its position against guard plate 36, thus maintaining the passage through the aperture of partition 18 open and unobstructed.

The latch member 42 is adapted to be unlatched by means of push rod 46 which is slidable in a bushing 47 projecting inwardly from a diaphragm chamber 48 formed on casing 16. Push rod 46 is provided at its inner end with a head which co-acts with the inner end of bushing 47 to act as a valve to prevent fluid leaks around said push rod when it is in its upward position. This head also acts as a stop to limit upward movement of pushrod 46. A flexible diaphragm 49 is secured by means of the vented cover plate 50 and screws 51 to the diaphragm chamber, and is provided with a central plate for contacting the upper end of push rod 46. A passage 52 formed in a thickened portion of casing 16 connects diaphragm chamber 48 with the suction opening of the Venturi tube 35. A second passage 53 also formed in said thickened portion of casing 16 communicates at one end with the diaphragm chamber and opens at the other end upon the surface of flange 21 where it registers with an opening in gasket 23 and a passage 54 formed in flange 24. Passage 54 in turn communicates with a tube or pipe 55 which passes down delivery pipe 25 interiorly thereof to a point near the end thereof where it joins a terminating member 56 having a closed end hole formed therein. A constriction plug 57 threadedly engages member 56 and passes through the wall of pipe 25. Plug 57 is provided with a relatively small constricted passage or orifice 58 which is of relatively short length. A larger passage 59 serves to connect passage 58 with the interior passage of member 56.

The operation of the device is as follows:

Assume the device to be attached by means of threads 11 to a suitable gasoline supply hose and that a meter or other form of gasoline pump is maintaining a pressure of, say 15 pounds per square inch pressure within chamber 10a, all parts of the device being positioned as shown in Figure 1. Gasoline pumps commonly employed for this purpose generally are supplied with a pressure operated by-pass valve which serves to by-pass the fluid so that the pump will maintain pressure within the supply hose and still not choke down due to the fact that at times no gasoline is being delivered from the hose. Such by-pass valves are usually capable of being set to regulate the pressure which will be built up in the hose.

If, under the conditions specified, the grip lever 15 is operated to open valve 12 gasoline will enter chamber 17a. When the parts occupy the positions shown in Figure 1, chambers 17a and 20 are thrown together or combined due to valve 38 being latched in its open position. The gasoline will therefore enter chamber 20 also and will exert pressure upon the annular surface of valve 26 and upon the end of piston 39. When the pressure in chamber 17a rises sufficiently to exert enough force against valve 26 to overcome the force of spring 31 this valve will be moved from its seat and gasoline will pass into chamber 16a. By regulating the pressure of spring 31 and/or the area of the annular surface of valve 26 the fluid pressure necessary to open valve 26 may be adjusted to any desired value. It should preferably be set to open at a considerably lower pressure than that at which the gasoline pump by-pass valve opens. We have found that a pressure of approximately 10 pounds per square inch or less is satisfactory.

The fluid pressure in chamber 17a is thus maintained reasonably constant regardless of how little or how much valve 12 may be opened. For a large opening of valve 12 a large quantity of gasoline enters chamber 17a and in order to accommodate this large flow and still maintain constant pressure in chamber 17a, valve 26 will move farther from its seat on partition 19, and for a small flow it will move closer to its seat.

The fluid pressure in chamber 17a is also exerting a force against piston 39 tending to move it farther into cylinder 27, and to carry valve plate 38 from its position adjacent guard plate 36 to its seat against partition 18. However, such movement of piston 39 and valve 38 is resisted slightly by the relatively weak spring 41 and entirely prevented by the notch in the end of latch member 42 which is engaged with the upper portion of guard plate 36 just above slot 45. The valve plate 38, due to its shielded position on the downstream side of guard plate 36 is not subjected to the wash of the fluid stream through the device and therefore the pressure on the latch member is reasonably constant and independent of rate of flow, being dependent upon the fluid pressure in chamber 17a, which is maintained constant by valve 26, and the area of piston 39. Spring 41 does not offer enough resistance to the movement of piston 39 to hinder such movement due to fluid pressure in chamber 17a, but does exert sufficient force to return piston 39, valve stem 37, valve plate 38, and latch member 42 to the position shown in Figure 1 in the absence of fluid pressure in chamber 17a.

From the above it will be seen that all that is required to shut off the entire fluid flow through the device is to depress latch member 42 until the notch in its end clears the upper edge of slot 45 whereupon the pressure of the fluid against piston 39 will move it and hence valve plate 38 to the right, latch member 42 passing into slot 45, until valve 38 seats against partition 18 as shown in Figure 2 thus entirely cutting off the flow of fluid through the device. Once valve 38 has seated upon partition 18 fluid pressure in chamber 17a against its upstream surface will retain it in this position against the resistance of spring 41 but, if valve 12 be closed the pressure in chamber 17a will almost immediately fall to zero due to small leakage past valve 38 and then spring 41 will return valve 38, latch 42 and piston 39 to their original positions as shown in Figure 1 and spring 44 will cause latch member 42 to again engage the upper edge of slot 45.

The means by which the latch 42 is operated to release valve 38 when the liquid in the tank being filled rises to a predetermined level operates as follows:

Assume the delivery pipe 25 to be inserted in a filler tube of an automobile fuel tank and that the small orifice or restricted aperture 58 occupies a position at the level to which it is desired to fill the tank. In certain fuel tanks the projecting plug 57 may conveniently be engaged or hooked under the lower end of the filler tube within the fuel tank to properly position the device.

If now the manual valve 12 be opened, gasoline will flow into chambers 17a and 20 and upon reaching a certain predetermined pressure therein will open valve 26 and pass into chamber 16a. A portion of the fluid in chamber 20 will, however, pass through the Venturi tube 35 into chamber 16a and in so doing will cause air to be drawn from diaphragm chamber 48 through passage 52 into the Venturi tube where it is ejected with the gasoline passing therethrough into chamber 16a. Since the fluid pressure in chambers 17a and 20 remains practically constant, the venturi 35 will be working under a stable and constant condition of fluid supply or head. If valve 12 is opened only a very small amount the amount of fluid entering chamber 17a will be just sufficient to maintain the constant pressure and valve 26 will remain closed. In this case the venturi is accommodating the entire flow through the device. Since, as was previously explained, the passage through the venturi is made very small only a very small opening of valve 12 is necessary to produce this condition and gasoline will be entering the fuel tank in a very small stream. If now manual valve 12 be opened wider more gasoline will enter chamber 17a in a certain time and the venturi 35 will be unable to accommodate the increased amount of fluid. Under these conditions valve 26 opens to allow the excess to pass without increasing the pressure in chamber 17a. It will thus be seen that, as long as valve 12 is opened more than some very small minimum, the venturi will be operating under constant and stable conditions regardless of the rate of flow through the device. This allows the operator to control the rate of fluid flow through exceedingly wide limits without affecting the operation of the device.

As the air is withdrawn from diaphragm chamber 48 by the Venturi tube 35 more air is supplied to the chamber 48, entering orifice 58, passing through passage 59, tube 55, and passages 54 and 53 to said chamber 48. The passages and openings are of such size that air is supplied to chamber 48 as rapidly as it is withdrawn and therefore no reduction of pressure in chamber 48 sufficient to move diaphragm 49 occurs. However, when the level of fluid in the tank rises sufficiently to cover orifice 58 air can no longer be supplied to chamber 48. Gasoline will enter orifice 58 but due to the great difference in viscosity it cannot enter the orifice at a sufficient rate to take the place of the air being withdrawn from chamber 48. Therefore the pressure in chamber 48 will be reduced until the atmospheric pressure acting through the vent in the cap 50 forces diaphragm 49 to move downward causing push rod 46 to depress latch member 42 until the notch in its end clears the upper edge of the slot 45 whereupon member 42 will pass further into slot 45 and allow valve 38, due to fluid pressure upon piston 39 to move to its seat against partition 18 thus entirely cutting off the fluid flow into chamber 20 and thus preventing fluid flow either through valve 26 or through the Venturi tube. The movement of valve 38 against its seat is very rapid and gives rise to a clicking noise or knock which may be distinctly heard by the operator while the shock of suddenly cutting off the fluid flow causes a jerking or bucking motion of the entire nozzle and hose which may be seen as well as felt. Thus the device gives ample indication to the operator that the automatic operation has taken place. If the cut-off is thought to be too sudden or abrupt it may be slowed down or softened to any desired extent merely by reducing the size of the opening 28a. The piston 39 and cylinder 27 will act as a dashpot and will control the speed with which valve 38 seats itself.

If, after operation of the automatic cut-off, the manual valve 12 is closed, the small leakage of valve 38 causes the pressure in chamber 17a to fall to zero and the spring 41 rests the parts in their normal position as previously described with no attention from the operator, and the device is ready immediately for another operation.

It will be remembered that, upon the liquid level reaching opening 58 a small amount of gasoline was drawn into the passages 59 and 55 through orifice 58. Now if the size of passages 59 and 55 were made small enough for the viscosity of the liquid to obstruct its passage therethrough the liquid remaining in the passages from a previous operation of the device would cause a false operation upon a subsequent trial. That is, the automatic cut-off would immediately operate to cut off the flow almost immediately after the valve 12 is opened and the operator would have great difficulty in getting any gasoline into the tank. In our invention we obviate this difficulty by making passages 59, tube 55, passages 54 and 52 so large that gasoline will travel through them fast enough to supply chamber 48 without lowering the pressure therein sufficiently to operate diaphragm 49. All of the restriction to fluid flow takes place in orifice 58 which is made very short in order that fluid remaining in it will be able to emerge from it into the larger passage 59 before the pressure in chamber 48 is reduced to the diaphragm-operating point. Thus, as long as orifice 58 is not submerged in the fluid, the diaphragm will not be operated and false operations due to entrapped fluid from previous operations are prevented.

As the gasoline emerges from delivery pipe 25 it must open and pass between the valve 33 and its seat 25a. The fluid pressure required to do this is exceedingly low due to the weakness of spring 34 which is only sufficiently strong to prevent gasoline entrapped in pipe 25 from draining therefrom after the flow is cut off by manual valve 12 or automatic valve 38.

Valve 33 prevents draining of the hose when the pump is not in operation and also prevents the nozzle from draining after the flow has been cut off either manually or automatically, thus saving time, preventing drips on the car finish and preventing overfilling where the cut-off is very near the upper end of the filler pipe of the fuel tank.

The operation of the nozzle, from the point of view of the operator is as follows:

If it is desired to fill the tank to a certain level, for example, to the bottom end of the filler pipe of the fuel tank, the delivery pipe is inserted into the filler pipe until orifice 58 is at the desired level, which may be conveniently accomplished by hooking plug 57 under the edge of the lower end of the filler pipe. The grip lever is gripped, opening the manual valve to any degree desired or necessitated by the circumstances whereupon gasoline will flow into the tank at the desired rate. Upon the fluid level reaching orifice 58 the automatic valve 38 will be operated to cut off the gasoline flow and the operator will both hear and feel the shock and see the bucking of the nozzle and hose, whereupon he will release grip lever 15 and withdraw the nozzle from the tank, valve 33 meanwhile preventing draining or dripping of gasoline from the nozzle. The device, immediately upon closure of valve 12 places itself in normal position and is ready for a subsequent operation.

If it is desired to place a measured quantity of gasoline in the tank the device is operated exactly as are the conventional nozzles commonly used at the present time, except that no draining or dripping takes place. The delivery pipe 25 is inserted in the filler pipe of the fuel tank and the manual valve 12 is opened so as to give the desired rate of flow and the fluid passes into the tank until the desired quantity has been delivered whereupon the operator releases grip lever 15 thus shutting manual valve 12 and stopping the flow. The automatic cut-off does not operate at all unless the desired quantity of gasoline proves to be sufficient to overfill the tank whereupon the automatic operation of the device will prevent running the tank over.

Since the orifice 58 is relatively small the device operates on the liquid contained in bubbles which are sometimes formed on the surface of liquids due to the agitation of the incoming stream. Since these bubbles frequently run out of the filler pipe even though the fluid does not, it is obviously an advantage for our device to operate on such bubbles or foam as well as upon the main body of the fluid.

Having thus described our invention in a specific embodiment, we are aware that numerous and extensive changes may be made from the embodiment herein illustrated and described, but without departing from the spirit of our invention, and we therefore claim our invention as set forth in the claims accompanying this specification and forming a part thereof.

We claim:

1. In a nozzle, a casing providing a supply chamber, a pressure chamber, a middle chamber, an outlet chamber, a manually operable valve between the supply chamber and the pressure chamber, a pressure operated valve between the pressure chamber and the middle chamber, means for latching said valve in an open position, spring loaded valve means between the middle chamber and the outlet chamber for maintaining constant pressure in the pressure chamber and the middle chamber, an aspirator tube having its inlet opening connected to the middle chamber and its outlet opening connected to the outlet chamber, and vacuum operated means for unlatching the pressure operated valve connected to said aspirator tube.

2. A nozzle as defined in claim 1 further characterized by the fact that said vacuum operated unlatching means comprises a diaphragm chamber connected to said aspirator tube, a diaphragm forming one wall of said chamber, a suction pipe connected to said diaphragm chamber, said suction pipe having a bore large enough to supply liquid to said diaphragm chamber at a sufficient rate to prevent said aspirator from producing an operative degree of vacuum in said chamber and terminating in a very thin restrictive member having therein an orifice of such size that it will supply air but will not supply liquid to said diaphragm chamber at a sufficient rate to prevent said aspirator from producing an operative degree of vacuum in said diaphragm chamber, and means connecting said diaphragm to said latching means.

3. In a nozzle, a casing, a normally closed manually operable valve in said casing, a normally open valve in said casing, pressure operated means urging said normally open valve to a closed position, resilient means urging said normally open valve to an open position, latching means for latching said normally open valve in an open position, and means controlled by the level of liquid in a receptacle being filled for unlatching said normally open valve.

4. In a nozzle, a generally cylindrical casing providing a pressure chamber, a middle chamber and a discharge chamber, apertured partitions definings said chambers within said casing, a pressure operated spring-loaded valve normally closing the aperture in the partition between the middle and discharge chambers, a cylinder carried by said valve, a piston in said cylinder and attached to a valve stem, guide bearings for said valve stem, a normally open valve located in the pressure chamber and attached to said valve stem and operable by fluid pressure against said piston to close the aperture in the partition between the pressure chamber and the middle chamber, a guard plate positioned upstream of said last named valve and adapted to normally shield said valve from the wash of the fluid flow, means associated with said guard plate and with said valve stem for latching said normally open valve in an open position and within the shielding influence of said guard plate, a resilient spring member positioned in said cylinder and abutting said piston and urging said piston and said normally open valve to its normal open position, said cylinder being provided with an orifice of suitable size whereby fluid entrapped within said cylinder by said piston is restricted in emerging therefrom and caused to cushion the movement of said piston and said normally open valve to the closed position, a Venturi tube positioned within said casing and extending through the partition between the middle chamber and the discharge chamber and having its inlet opening communicating with said middle chamber and its discharge opening communicating with said discharge chamber, a diaphragm chamber communicating with the suction opening of said Venturi tube, a diaphragm in said diaphragm chamber, means extending from said diaphragm to said latching means whereby movement of said diaphragm in one direction causes said latching means to unlatch and allow said normally open valve to move to its closed position under influence of fluid pressure against said piston, a suction pipe communicating with said diaphragm chamber, said suction pipe having a bore of sufficient size to supply liquid to said chamber at a sufficient rate to prevent said venturi from producing a vacuum in said diaphragm chamber sufficient to cause said diaphragm to move in a direction to unlatch said latching means, a thin restriction member restricting the inlet to said suction tube and having an inlet orifice of sufficient size to supply air but not liquid to said diaphragm chamber at a sufficient rate to prevent said aspirator from producing a sufficient vacuum therein to cause said diaphragm to move in a direction to unlatch said latching means, and an outwardly opening, spring loaded, drain preventing valve located at the outlet opening of said discharge chamber.

5. In a nozzle, a casing provided with an inlet chamber and an outlet chamber having a passage therebetween, means for maintaining a constant pressure in said inlet chamber, an aspirator joining said chambers, and means operatively associated with said aspirator to shut off fluid flow through said casing at a point between said chambers.

6. In a nozzle, a casing providing a plurality of chambers having a passage therebetween, means for maintaining a constant pressure in one of said chambers, an aspirator joining said chambers, and means operated by said aspirator for closing the passage between said chambers.

7. In a nozzle, a casing providing an inlet chamber and an outlet chamber having a passage therebetween, means for maintaining a constant pressure in said inlet chamber, an aspirator joining said chambers, a valve operable to close the passage between said chambers, and means operable by said aspirator for closing said valve.

8. In a nozzle, a casing providing a fluid chamber having a passage therethrough, means for maintaining a substantially constant pressure in said chamber, an aspirator connected to said chamber, and means operable by said aspirator for closing the passage through said chamber.

9. In a nozzle, a casing providing a pressure chamber and discharge chamber, said pressure chamber having an outlet passage, valve means operable to close said passage, pressure actuated means urging said valve to close said passage, means for latching said valve in an open position, vacuum operated means for unlatching said valve, spring loaded valve means for maintaining a constant pressure in said pressure chamber, and a Venturi tube operated from said pressure and operably connected to said vacuum operated unlatching means.

10. In a nozzle, a casing, a discharge tube joined to said casing, a manually operable valve in said casing, a normally open pressure closable valve in said casing, means for latching said pressure closable valve in its open position, an aspirator tube in said casing, spring-loaded valve means for maintaining a constant fluid pressure at the inlet opening of said aspirator tube, and vacuum operated means joined to said aspirator tube for unlatching said pressure closable valve.

11. In a device for delivering fluids into tanks or other containers, a casing providing a chamber through which the fluid is caused to flow, means for maintaining a substantially constant fluid pressure in the chamber, an aspirator connected to the chamber and means operable by the aspirator to shut off the fluid flow when the fluid in the container reaches a pre-determined level.

ROBERT T. KILLMAN.
THOMAS A. KILLMAN.